(12) United States Patent
Sammons

(10) Patent No.: US 9,623,777 B2
(45) Date of Patent: Apr. 18, 2017

(54) VEHICLE SEAT ASSEMBLY

(71) Applicant: Nissan North America, Inc., Franklin, TN (US)

(72) Inventor: Justin Sammons, Southgate, MI (US)

(73) Assignee: Nissan North America, Inc., Franklin, TN (US)

( * ) Notice: Subject to any disclaimer, the term of this patent is extended or adjusted under 35 U.S.C. 154(b) by 84 days.

(21) Appl. No.: 14/743,609

(22) Filed: Jun. 18, 2015

(65) Prior Publication Data

US 2016/0368404 A1    Dec. 22, 2016

(51) Int. Cl.
```
B60N 2/54    (2006.01)
B60N 2/70    (2006.01)
B60N 2/68    (2006.01)
B60N 2/64    (2006.01)
```

(52) U.S. Cl.
CPC .............. B60N 2/54 (2013.01); B60N 2/646 (2013.01); B60N 2/68 (2013.01); B60N 2/7047 (2013.01)

(58) Field of Classification Search
CPC ...... B60N 2/54; B60N 2/7094; B60N 2/7041; B60N 2/7052; B60N 2/7058; B60N 2/7047; B60N 2/7076
See application file for complete search history.

(56) References Cited

U.S. PATENT DOCUMENTS

| | | | | |
|---|---|---|---|---|
| 884,710 | A * | 4/1908 | Budd | B60N 2/7041 139/425 R |
| 2,005,454 | A * | 6/1935 | Clark | B60N 2/7041 24/546 |
| 2,235,878 | A * | 3/1941 | Haberstump | B60N 2/7041 267/103 |
| 2,251,318 | A * | 8/1941 | Schott | A47C 23/24 267/110 |
| 2,291,429 | A * | 7/1942 | Wolfe | A47C 7/30 267/87 |
| 3,198,578 | A * | 8/1965 | Hoppe | A47C 7/20 267/112 |

(Continued)

FOREIGN PATENT DOCUMENTS

| | | |
|---|---|---|
| EP | 1813470 A1 | 8/2007 |
| GB | 557200 A | 11/1943 |
| GB | 745747 A | 2/1956 |

OTHER PUBLICATIONS

H-point, Wikipedia, the free encyclopedia, Apr. 2015.

*Primary Examiner* — Timothy J Brindley
(74) *Attorney, Agent, or Firm* — Global IP Counselors, LLP

(57) ABSTRACT

A vehicle seat assembly has a seat bottom frame, a seat suspension structure, a strap structure and a cushion material. The seat suspension structure is fixed to the seat bottom frame and extends through a seat cushion receiving area of the seat bottom frame. The strap structure is attached to one of a front frame portion of the seat bottom frame and a front end of the seat suspension structure, and is attached to one of a rear frame portion and a rear end of the seat suspension structure. The strap structure extends through the seat cushion receiving area and is slack with a passenger seated on the cushion material. Downward movement of the seat cushion in response to a rapid change in momentum causes the strap structure to become taught restricting further downward movement of the passenger.

19 Claims, 6 Drawing Sheets

(56) References Cited

U.S. PATENT DOCUMENTS

| | | | |
|---|---|---|---|
| 3,670,119 A * | 6/1972 | Gebhardt | H01H 3/141 200/52 R |
| 4,858,992 A | 8/1989 | LaSota | |
| 4,869,554 A | 9/1989 | Abu-Isa et al. | |
| 6,609,753 B2 | 8/2003 | Schmidt-Schaeffer | |
| 7,703,855 B1 | 4/2010 | Kalinowski | |
| 8,240,758 B2 | 8/2012 | Combest | |
| 2007/0040311 A1* | 2/2007 | Maas | A47C 7/025 267/142 |
| 2013/0119728 A1* | 5/2013 | Schmitt | B60N 2/54 297/217.3 |
| 2014/0117738 A1* | 5/2014 | Takahashi | B60N 2/7035 297/452.56 |
| 2016/0288681 A1* | 10/2016 | Ferretti | B60N 2/64 |

* cited by examiner

VEHICLE SEAT ASSEMBLY

BACKGROUND

Field of the Invention

The present invention generally relates to a vehicle seat assembly. More specifically, the present invention relates to seat structure that limits downward movement of a passenger on the seat structure in response to predetermined changes in momentum.

Background Information

A vehicle seat assembly is typically provided with numerous features that ensure a comfortable riding experience for a passenger seated in the vehicle seat assembly. The vehicle seat assembly also includes many occupant movement restricting features, such as anti-submarining structures that limit forward movement of the passenger in response to an impact event where rapid changes in momentum of a vehicle can cause unwanted movement of the passenger relative to the vehicle seat assembly. However, there are few, if any, vehicle seat assemblies that limit downward displacement of a passenger seated in the seat structure in response to rapid changes in momentum.

SUMMARY

One object of the present disclosure is to provide a seat assembly with a strapping structure that restricts downward movement of a passenger seated on the seat assembly in response to rapid changes in momentum.

In view of the state of the known technology, one aspect of the present disclosure is to provide a vehicle seat assembly with a seat bottom frame, a seat suspension structure, a strap structure and a cushion material. The seat bottom frame includes a front frame portion and a rear frame portion that define a seat cushion receiving area therebetween. The seat suspension structure has a front end attached to the front frame portion and a rear end attached to the rear frame portion such that the seat suspension structure extends through the seat cushion receiving area. The strap structure has a front portion attached to one of the front frame portion and the front end of the seat suspension structure, and a rear portion attached to one of the rear frame portion and the rear end of the seat suspension structure. The strap structure extends through the seat cushion receiving area. The cushion material is attached to the seat bottom frame and extends over the seat bottom frame, the seat suspension structure, the strap structure and the seat cushion receiving area. The cushion material defines a hip receiving surface. When a vehicle passenger is seated on the hip receiving surface of the cushion material, the passenger's weight causes downward movement of the hip receiving surface into the seat cushion receiving area, and also causes the seat suspension structure to undergo elastic downward movement within a first movement range providing comfort to the vehicle passenger. During movement within the first movement range, the strap structure is dimensioned to remain slack. Further downward movement of the hip receiving surface into the seat cushion receiving area causes the seat suspension structure to undergo further elastic downward movement within a second movement range causing the strap structure to become taught thereby restricting downward movement of the seat suspension structure beyond the second movement range.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
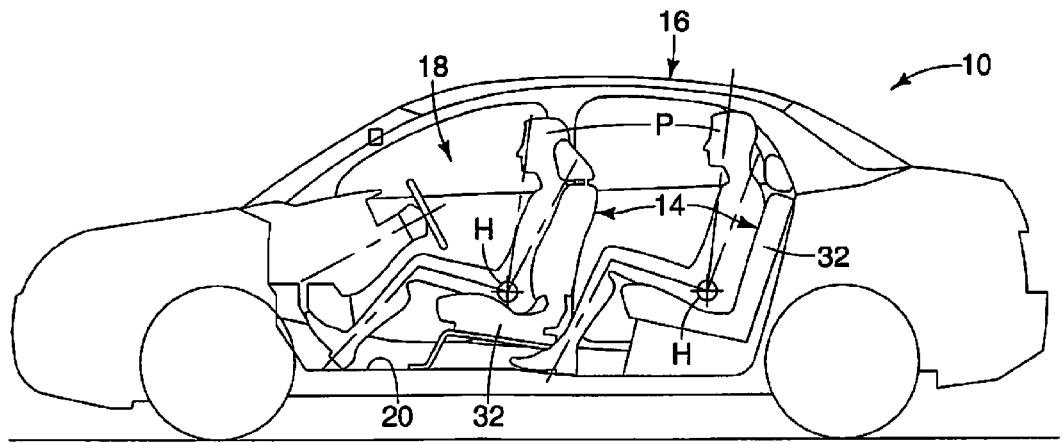
FIG. 1 is a side view of a vehicle showing a plurality of seat assemblies, each seat assembly being covered by cushion material in accordance with a first embodiment.

Referring initially to FIG. 1, a vehicle 10 having a plurality of seat assemblies 14 is illustrated in accordance with a first embodiment. Each of the seat assemblies 14 is configured to limit downward movement of a passenger or occupant seated in the seat assembly 14 in response to rapid changes in momentum, for example, during an impact event. Since all of the seat assemblies 14 include structure that limits downward movement, only one seat assembly 14 is described below for the sake of brevity.

The vehicle 10 is a conventional vehicle that includes a vehicle body structure 16 that defines a passenger compartment 18. The vehicle body structure 16 includes a floor 20, with the seat assemblies 14 being fixedly attached to the floor 20 by mechanical fasteners (not shown). It should be understood from the drawings and the description herein that the vehicle 10 includes doors (not shown). The doors have been removed to reveal the passenger compartment 18 and the seat assemblies 14 that are installed to the floor 20 within the passenger compartment 18.

Figure 2:
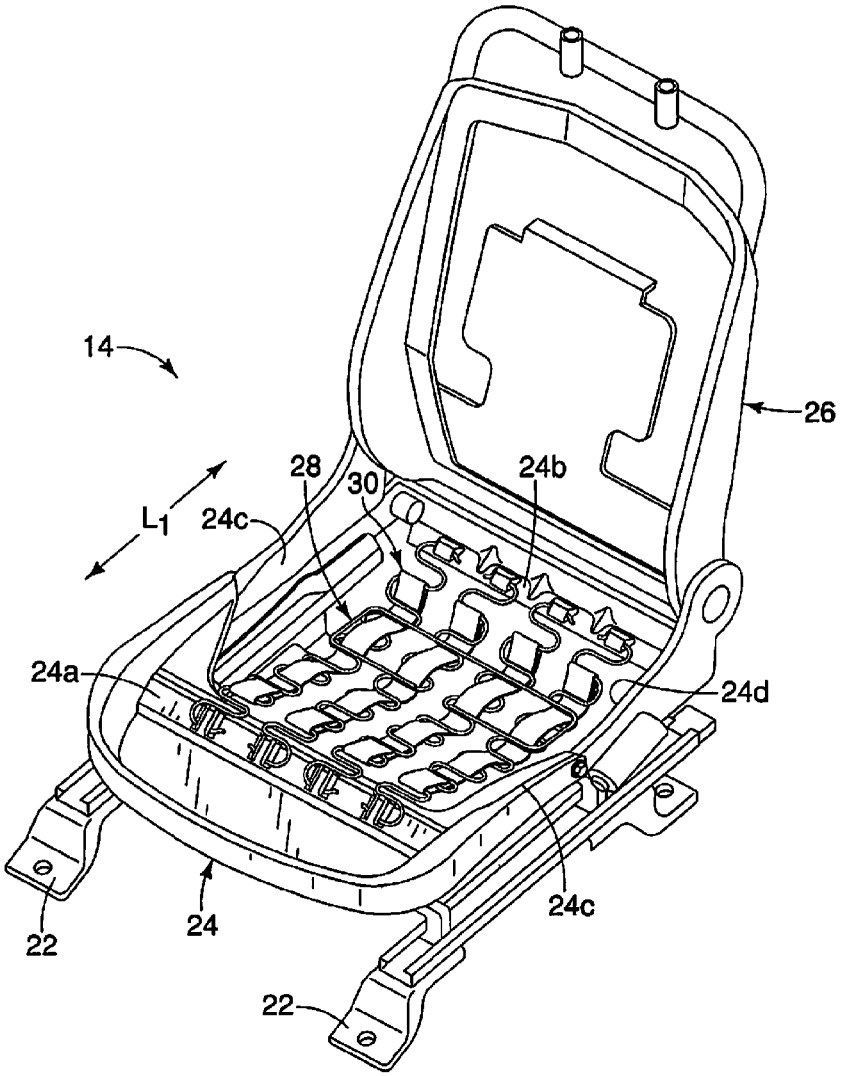
FIG. 2 is a perspective view of one of the seat assemblies shown removed from the vehicle and showing a seat bottom frame, a seatback frame, a seat suspension structure and a strap structure with a cushion material removed in accordance with the first embodiment.

As shown in FIG. 2, the seat assembly 14 includes a pair of supporting rails 22 (for front seats only), a seat bottom frame 24, a seatback frame 26, a seat suspension structure 28, a strap structure 30 and a cushion material 32 (removed in FIG. 2).

The pair of supporting rails 22 is provided at bottom portions of the seat bottom frames 24 of front seats of the seat assemblies 14, and can optionally be provided at rear seats of the seat assemblies 14. The supporting rails 22 are conventional structures that allow the seat assembly 14 to be moved and re-positioned to any of a plurality of locations (not shown) relative to a vehicle longitudinal direction $L_1$. A positioning mechanism (not shown) is installed within the seat assembly 14 allowing a passenger P to position the seat assembly 14 to any one of the plurality of locations along the supporting rails 22. Since supporting rails 22 and corresponding positioning mechanisms are conventional structures, further description is omitted for the sake of brevity.

The seat bottom frame 24 includes a front frame portion 24a, a rear frame portion 24b and side portions 24c. A seat cushion receiving area 24d is defined between the front frame portion 24a and the rear frame portion 24b, and between the two side portions 24c. In other words, the seat cushion receiving area 24d is an open space encircled by the front frame portion 24a, the rear frame portion 24b, and the side portions 24c.

The front frame portion 24a further serves as a front femoral supporting portion and the rear frame portion 24b serves as a rear buttocks supporting portion. The front frame portion 24a can additionally be shaped, constructed or otherwise designed to define an anti-submarining beam extending laterally across a front side of the seat cushion receiving area 24d of the seat assembly 14. The anti-submarining aspect of the front frame portion 24a is configured to restrict movement of a buttocks of the passenger P relative to the vehicle longitudinal direction $L_1$ from the rear frame portion 24b towards the front frame portion 24a. Anti-submarining structures are conventional structures as described in, for example, U.S. Pat. No. 8,240,758, assigned to Nissan North America, Inc. The disclosure of U.S. Pat. No. 8,240,758 is incorporated herein by reference in its entirety. Since anti-submarining structures are conventional structures, further description is omitted for the sake of brevity.

The seatback frame 26 is attached to a rear portion of the seat bottom frame 24 for pivoting movement in a conventional manner. An example of a seatback frame is disclosed in, for example, U.S. Pat. No. 7,703,855, assigned to Nissan North America, Inc. The disclosure of U.S. Pat. No. 7,703,855 is incorporated herein by reference in its entirety. Since seatback frame structures are conventional structures, further description is omitted for the sake of brevity.

Figure 3:
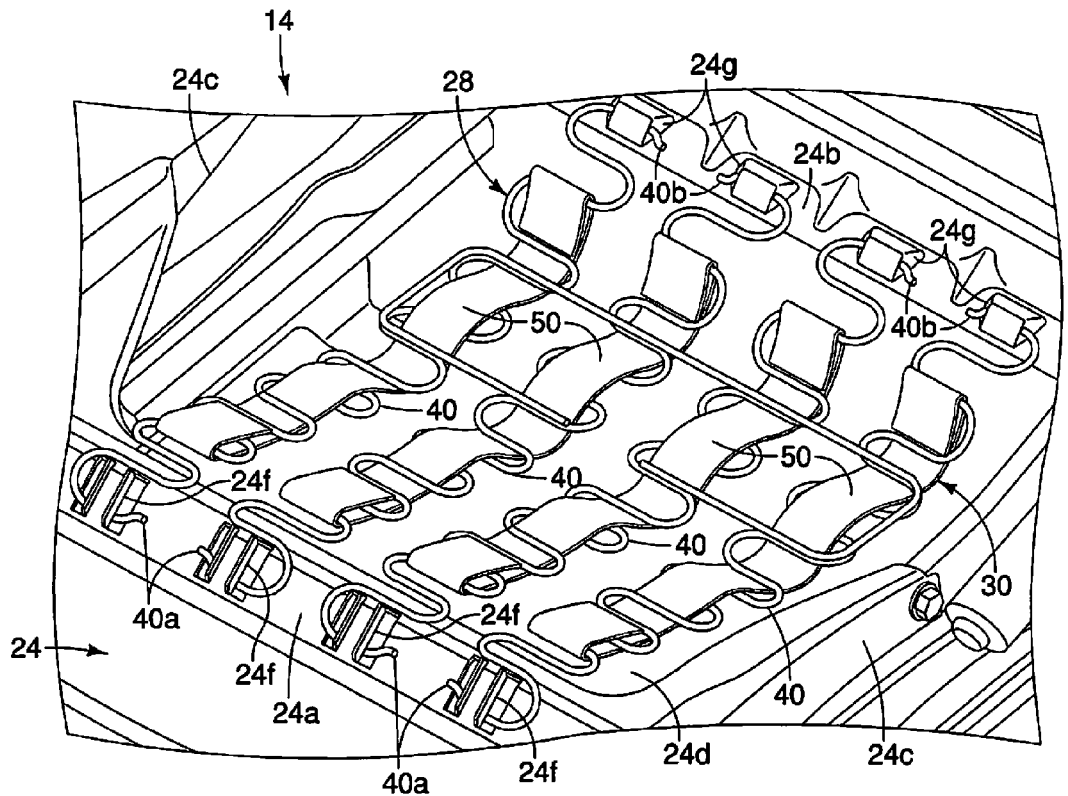
FIG. 3 is a perspective view of a portion of the seat assembly showing details of the seat bottom frame, the seat suspension structure having a plurality of S-springs and the strap structure having a plurality of flexible straps in accordance with the first embodiment.

As shown in FIGS. 2 and 3, the seat suspension structure 28 includes a plurality of S-springs 40, each having an overall serpentine shape, sinusoidal shape or undulating shape. Specifically, each S-spring 40 includes alternating curved portions 42 and straight portions 44. The straight portions 44 extend in directions parallel to one another, and the curved portions 42 extend between adjacent ones of the straight portions 44. Each of the S-springs 40 has a front end 40a and a rear end 40b. The front ends 40a are fixedly attached to the front frame portion 24a and the rear ends 40b are fixedly attached to the rear frame portion 24b such that the seat suspension structure 28 (the S-springs 40) extends over and at least partially through the seat cushion receiving area 24d.

The front ends 40a can be fixedly attached to the front frame portion 24a by any of a variety of mechanical structures. For example, the front frame portion 24a can be provided with slots 24f that receive the front ends 40a. Each of the front ends 40a serves as a hook that is inserted into a corresponding one of the slots 24f thereby retaining the S-springs 40 to the front frame portion 24a. Alternatively, the front frame portion 24a can be provided with clamping members (not shown) that attach via mechanical fasteners (not shown) to the front frame portion 24a, clamping the front ends 40a to the front frame portion 24a. Similarly, the rear ends 40b can be fixedly attached to the rear frame portion 24b by any of a variety of mechanical structures. For example, the rear frame portion 24b can be provided with slots 24g that receive the rear ends 40b. Each of the rear ends 40b serves as a hook that is inserted into a corresponding one of the slots 24g thereby retaining the S-springs 40 to the rear frame portion 24b. Alternatively, the rear frame portion 24b can be provided with clamping members (not shown) that attach via mechanical fasteners (not shown) to the rear frame portion 24b, clamping the rear ends 40b to the rear frame portion 24b.

It should be understood from the drawings and the description herein that the S-springs 40 represent only one example of a seat suspension structure. Any of a variety of alternate configurations of suspension structures can replace the S-springs 40. For example, the S-springs 40 are oriented such that they extend in the vehicle longitudinal direction $L_1$. The S-springs 40 can be rotated 90 degrees such that they extend between the side portion 24c transverse to the vehicle longitudinal direction $L_1$. Further, the S-springs 40 can be replaced with elastic material, such as elastic straps or other similar upholstery material that flexes, elongates in response to the weight of the passenger P and provides the passenger P with comfort while sitting in the seat assembly 14.

In the depicted embodiment, there are four S-springs 40. However, a greater number of the S-springs 40 or fewer number of S-springs 40 can be employed, depending upon design of the seat assembly 14, the relative size of the S-springs 40, the size and configuration of the seat bottom frame 24, and the elastic properties (i.e. the spring constant) of the S-springs 40. The four S-springs 40 extend in the vehicle longitudinal direction $L_1$ and are therefore, parallel to one another. The S-springs 40 are made of a rigid metallic material. However, due to the alternating arrangement of the curved portions 42 and the straight portions 44, the curved portions 42 are able to undergo limited elastic deformation, thereby allowing the S-springs 40 to resiliently undergo elastic elongation due to the tensile forces acting thereon as a result of the passenger P sitting thereon. Hence, when the passenger P is seated in the seat assembly 14, the S-springs 40 are able to undergo a predetermined amount of elongation in a conventional manner.

Figure 4:
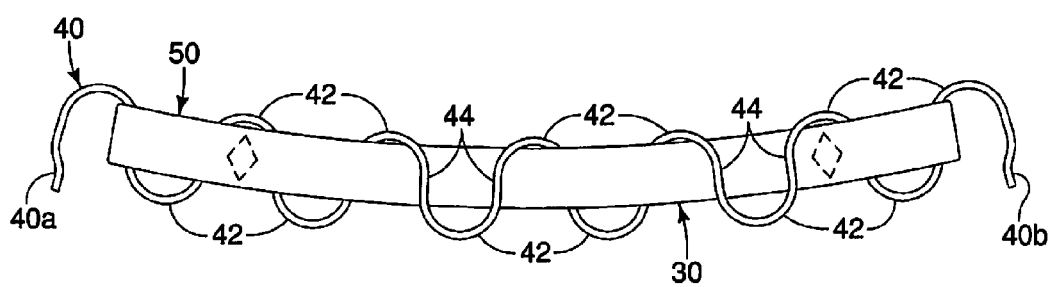
FIG. 4 is a top view of one of the S-springs of the seat suspension structure and one of the flexible straps of the strap structure in accordance with the first embodiment.
Figure 5:
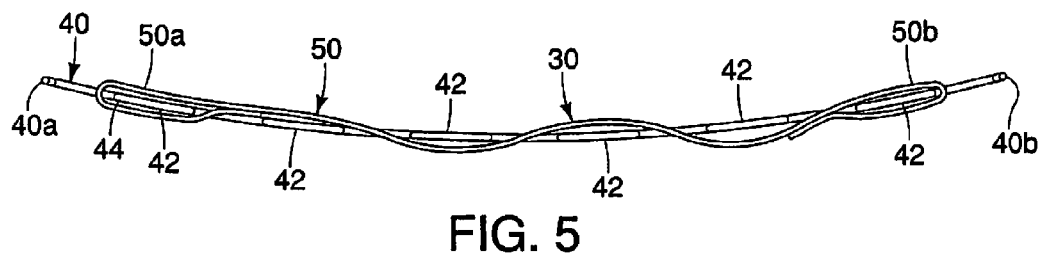
FIG. 5 is a side view of the S-springs depicted in FIG. 4, showing the flexible strap alternatingly interwoven between looped sections of the S-spring in accordance with the first embodiment.

Each pair of adjacent straight portions 44 and the curved portion 42 curving therebetween defines a loop section of the S-spring 40. As shown in FIGS. 3-5, a plurality of loop sections are defined on each S-spring 40.

As shown in FIGS. 3, 4 and 5, the strap structure 30 includes a plurality of flexible straps 50, each of the flexible straps 50 having a fixed non-extendable length. Each of the flexible straps 50 is made of material that can easily be folded or bent, but does not undergo elastic deformation when placed under tension (it does not stretch). For example, each of the straps 50 can be made of a high strength woven material or webbing material that is similar to the material used for seat belts. The straps 50 can alternatively be made of a leather material or leather like material, or can be made of reinforced metallic strips. In the depicted embodiment, the flexible straps 50 can be made from, for example, nylon fibers, polypropylene or polyester fiber materials, or combinations thereof that are meshed or woven together as a fabric into elongated strips that are belt-like and/or rope-like.

Each of the straps 50 of the strap structure 30 has a front portion or front loop 50a and a rear portion or rear loop 50b. Specifically, the front loop 50a includes a portion of the strap 50 that is folded back against another section of the strap 50 and fixedly attached thereto defining the front loop 50a. Similarly, the rear loop 50b includes a portion of the strap 50 that is folded back against another section of the strap 50 and fixedly attached thereto defining the rear loop 50b.

In the first embodiment shown in FIGS. 1-5. Each of the front loops 50a is installed to a front loop section of a corresponding one of the S-springs 40. Specifically, two adjacent ones of the straight portions 44 at the front of the S-spring 40 are inserted into the front loop 50a. Hence, the front portion or front loop 50a of each of the straps 50 is attached to the front end of corresponding one of the S-springs 40. Similarly, each of the rear loops 50b is installed to a rear loop section of a corresponding one of the S-springs 40. Specifically, two adjacent ones of the straight portions 44 at the rear of the S-spring 40 are inserted into the rear loop 50b. Hence, the rear portion or rear loop 50b of each of the straps 50 is attached to the rear end of corresponding one of the S-springs 40. The straps 50 can be fixed in position to the S-springs 40 by rivets (not shown), mechanical fasteners or adhesive material.

As shown in FIGS. 4 and 5, in the first embodiment, the straps 50 can be woven above and below adjacent loop portions of the S-spring 40. More specifically, each of the straps 50 can be installed to the S-spring 40 such that the strap 50 extends over a pair of the straight portions 44, then under the next pair of the straight portions 44, then over the next pair of straight portions 44 in an alternating or sinusoidal manner. However, each of the straps 50 is slack when installed to the corresponding one of the S-springs 40 and the seat bottom frame 24.

The cushion material 32 is attached to the seat bottom frame 24 via fasteners (not shown). The cushion material 32 extends over the seat bottom frame 24, the seat suspension structure 28, the strap structure 30 and the seat cushion receiving area 24d. The cushion material 32 can be made of leather, leather like material or textile material, with a cushion filler material disposed therein. Since cushion material is a conventional material and has conventional attaching structures, further description is omitted for the sake of brevity.

Figure 11:
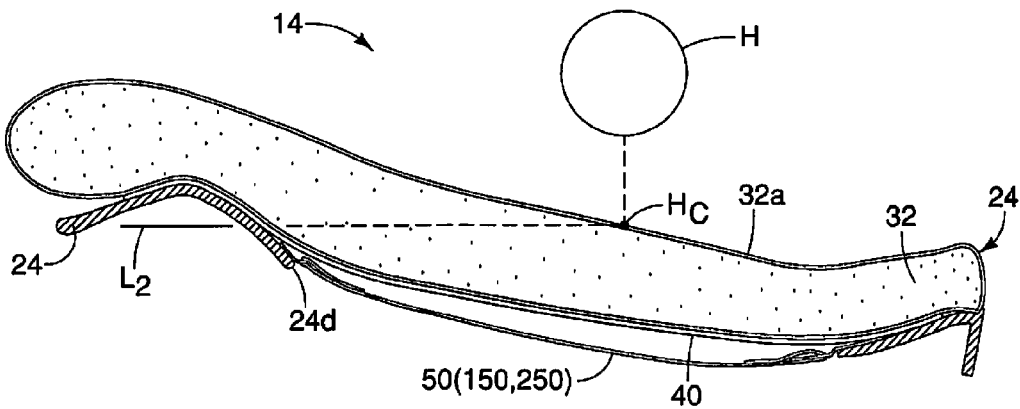
FIG. 11 is a side schematic view of the seat assembly showing the seat bottom frame, the seat suspension structure, the strap structure and the cushion material in an unoccupied condition and in the at rest orientation, with a portion of an upper surface of the cushion material below the H-point of the ATD being in a first location in accordance with the first, second and third embodiments.
Figure 12:
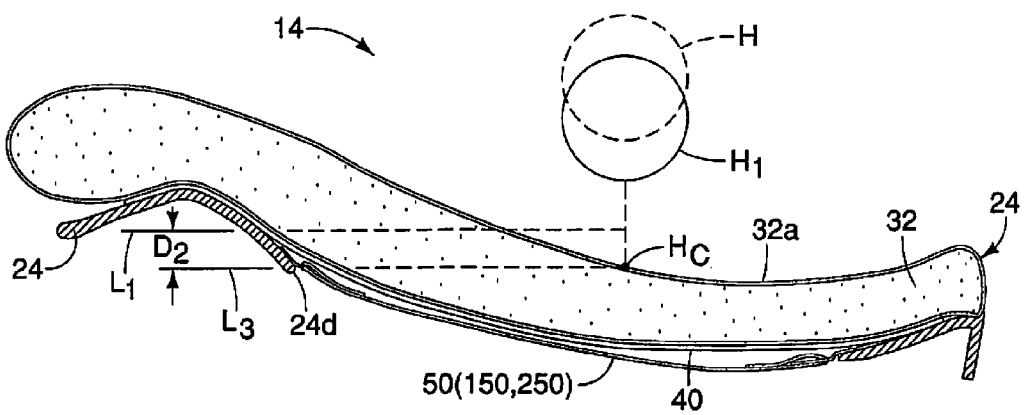
FIG. 12 is another side schematic view of the seat assembly showing the seat bottom frame, the seat suspension structure, the strap structure and the cushion material in an occupied condition, with the cushion material and the S-springs of the seat suspension structure carrying the mass of the ATD, with the upper surface of the cushion material below the H-point of being in a second location below the first location with the strap assembly in the slack, non-tensioned condition in accordance with the first, second and third embodiments.
Figure 13:
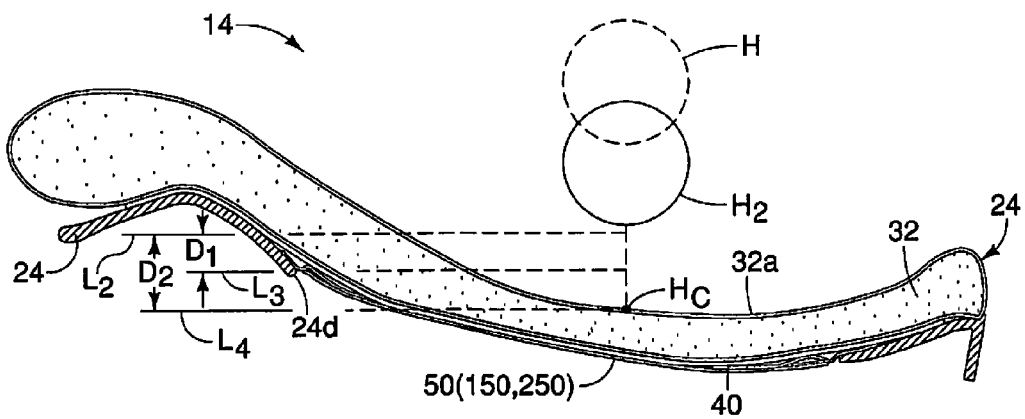
FIG. 13 is yet another side schematic view of the seat assembly showing the seat bottom frame, the seat suspension structure, the strap structure and the cushion material in a further occupied condition, with the cushion material and the S-springs of the seat suspension structure carrying the mass of the passenger and carrying a further load associated with rapid changes in momentum, with the upper surface of the cushion material below the H-point of being in a third location below the first and second locations with the strap assembly being in the tensioned condition in accordance with the first, second and third embodiments.

As shown in FIGS. 11, 12 and 13, the cushion material 32 defines a hip receiving surface 32a. When a passenger P is seated on the hip receiving surface 32a, the hips of the passenger P are usually within an area known in the art as the hip point or H-point H. The H-point H is defined within the circle H depicted in FIGS. 1, 11, 12 and 13 and is centered above a central part $H_C$ of the hip receiving surface 32a. As is explained below after a brief description of second and third embodiments, the central part $H_C$ moves downward in response to the weight or mass of the passenger P seated on the cushion material 32.

Second Embodiment

Figure 6:
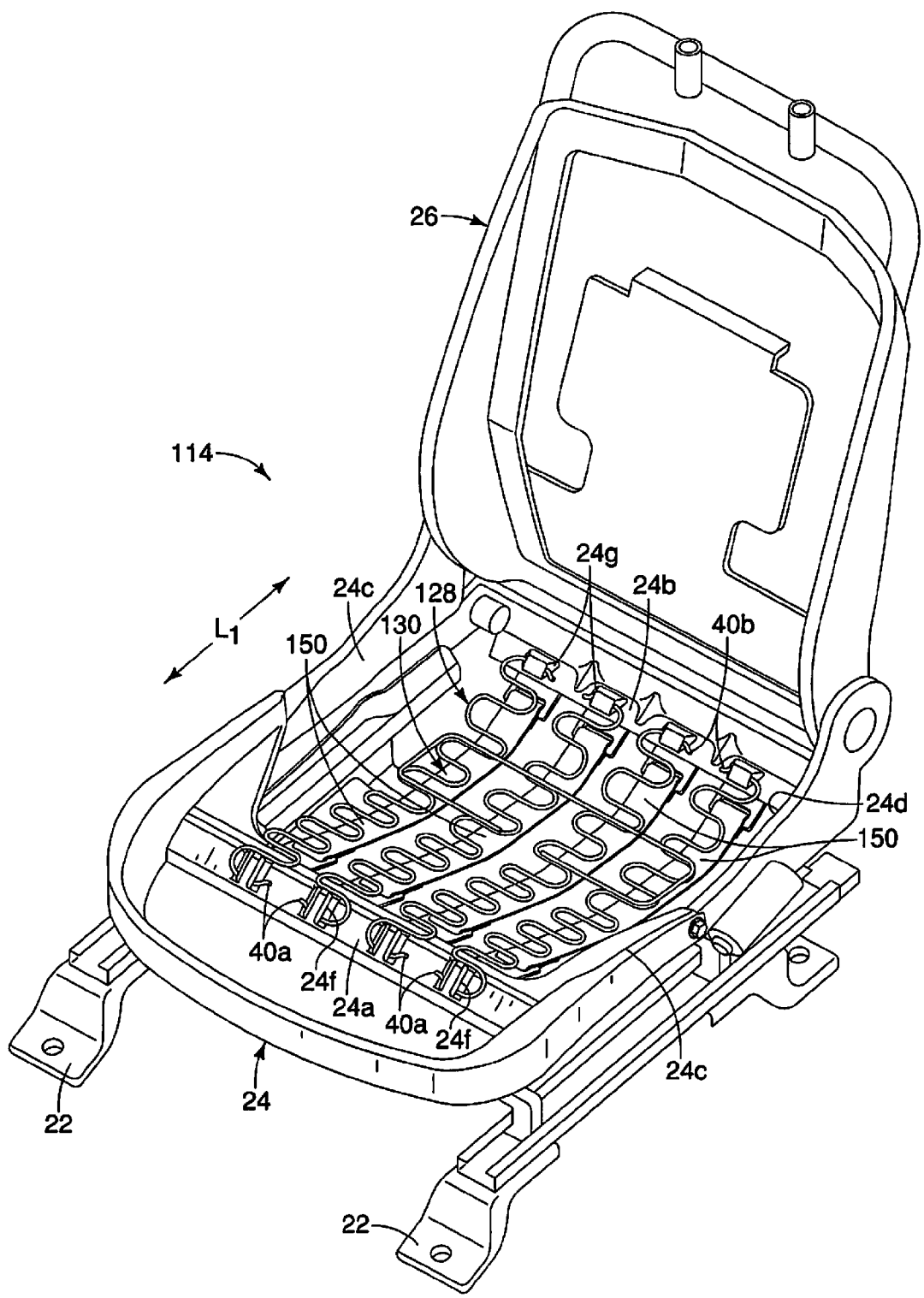
FIG. 6 is a perspective view of a seat assembly shown removed from a vehicle and showing a seat bottom frame, a seatback frame, a seat suspension structure and a strap structure with a cushion material removed in accordance with a second embodiment.
Figure 7:
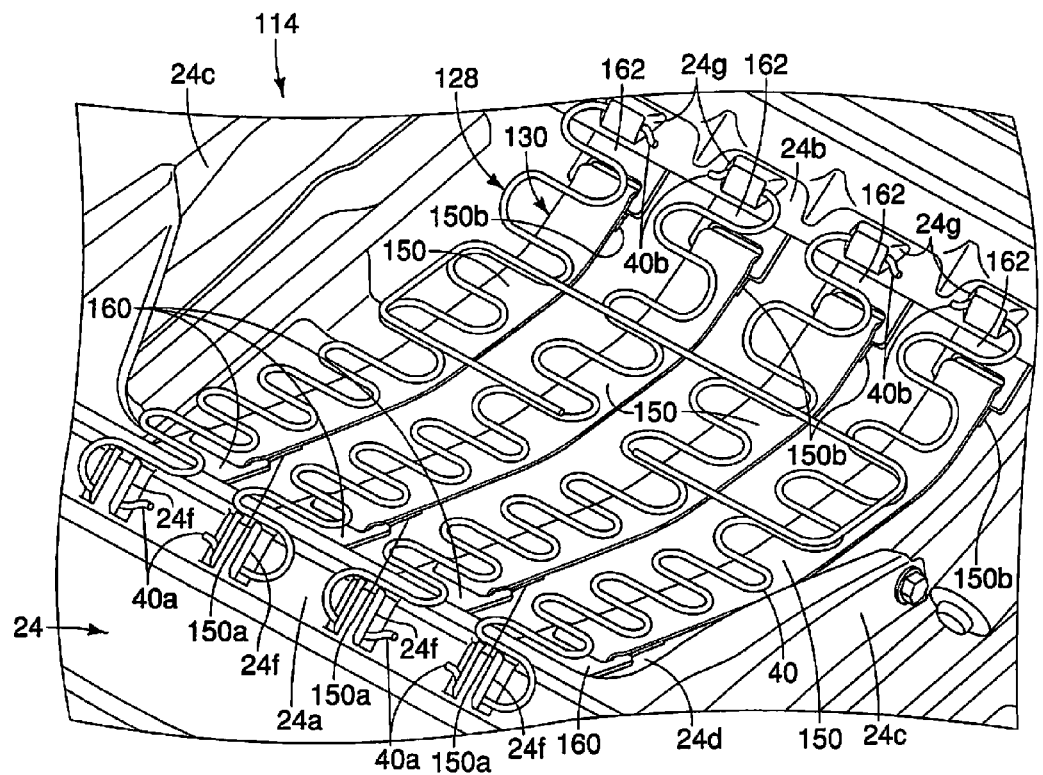
FIG. 7 is a perspective view of a portion of the seat assembly depicted in FIG. 6 showing details of the seat bottom frame, the seat suspension structure having a plurality of S-springs and the strap structure having a plurality of flexible straps that extend beneath the S-springs, with opposite ends of each flexible strap being attached to front and rear sections of the seat bottom frame in accordance with the second embodiment.

Referring now to FIGS. 6 and 7, a seat assembly 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the seat assembly 114 includes many of the features of the first embodiment, such as the seat bottom frame 24, the seat back frame 26 and the cushion material 32. However, in the second embodiment, the seat suspension structure 28 of the first embodiment is replaced with a seat suspension structure 128 and the strap structure 30 of the first embodiment is replaced with a strap structure 130.

The seat bottom frame 24 includes all of the features described above in the first embodiment. However, the seat bottom frame 24 in the second embodiment includes added features in the form of brackets 160 and 162 that are welded to the seat bottom frame 24, or alternatively are fixedly attached via mechanical fasteners, such as threaded screws or rivets. The brackets 160 (a front frame portion) are fixed to a rearward side of the front frame portion 24a and the brackets 162 (a rear frame portion) are fixed to a forward side of the rear frame portion 24b. The brackets 160 and 162 extend into the seat cushion receiving area 24d.

In the second embodiment, the seat suspension structure 128 includes the S-springs 40, but differs from the seat suspension structure 28 of the first embodiment in that the strap structure 130 does not attach to the S-springs 40 and in most circumstances, does not contact the S-springs 40, as is explained in greater detail below.

The strap structure 130 includes a plurality straps 150. The straps 150 are identical to the straps 50 of the first embodiment, except that front loops 150a of the straps 150 are attached to corresponding ones of the brackets 160 and rear loops 150b of the straps 150 are attached to corresponding ones of the brackets 162. In the second embodiment, the straps 150 are entirely located under the S-springs 40 of the seat suspension structure 128, and hence are not interwoven above and below loop sections of the S-springs 40.

In the depicted second embodiment, there are four S-springs 40 and four straps 150. However, it should be understood from the drawings and the description herein that the number of S-springs 40 and the number of straps 150 need not be equal. It is possible to have four S-springs 40 and only three of straps 150. The straps 150 serve the same purpose and function as the straps 50 of the first embodiment, as is described in greater detail below after a description of a third embodiment.

Third Embodiment

Figure 8:
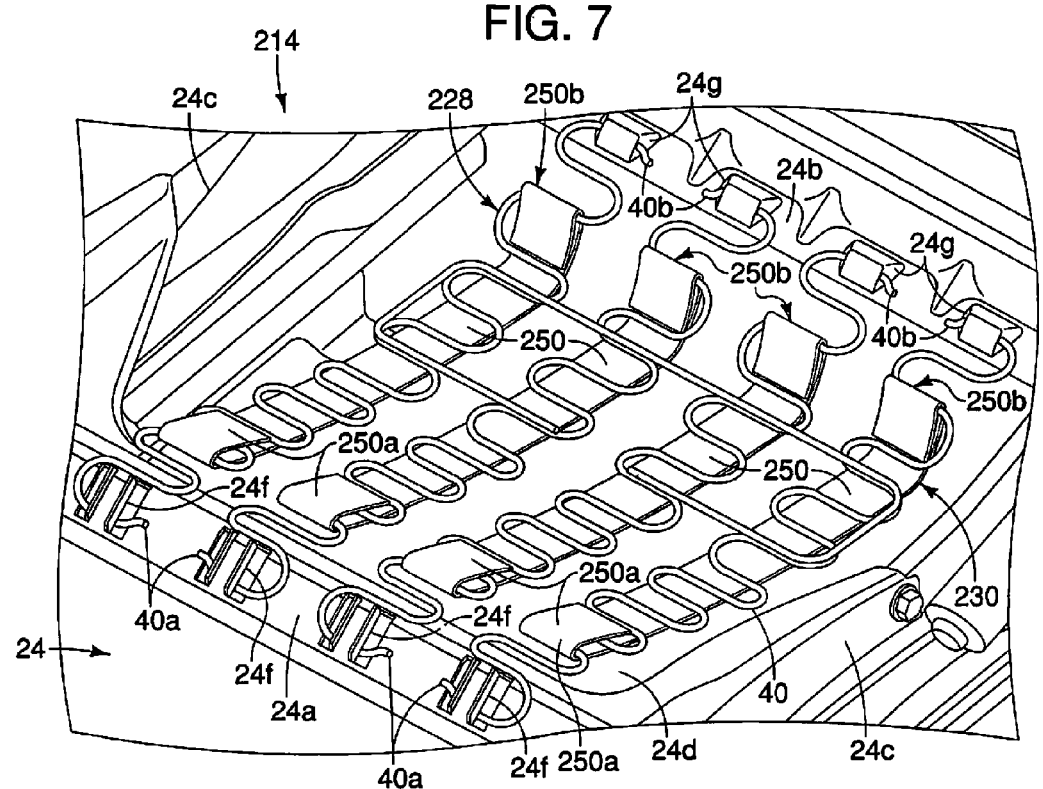
FIG. 8 is a perspective view of a portion of a seat showing details of a seat bottom frame, a seat suspension structure having a plurality of S-springs and the strap structure having a plurality of flexible straps that extend beneath the S-springs with opposite ends of each flexible strap being attached to front and rear sections of an adjacent one of the S-springs in accordance with a third embodiment.

Referring now to FIG. 8, a seat assembly 214 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the seat assembly 214 includes many of the features of the first embodiment, such as the seat bottom frame 24, the seat back frame 26, the seat suspension structure 28 and the cushion material 32. However, in the third embodiment, the strap structure 30 of the first embodiment is replaced with a strap structure 230.

The seat bottom frame 24, the seat back frame 26, the seat suspension structure 28 and the cushion material 32 is as described above with respect to the first embodiment.

However, in the third embodiment, the strap structure 230 includes a plurality straps 250. The straps 250 are identical to the straps 50 of the first embodiment with each of front loops 250a of the straps 250 being installed to a front loop section (two front straight portions 44) of a corresponding one of the S-springs 40 and each of rear loops 250b of the straps 250 being installed to a rear loop section (two rear straight portions 44) of a corresponding one of the S-springs 40. However, in the third embodiment, the straps 250 are entirely located under the S-springs 40 of the seat suspension structure 28, and hence are not interwoven above and below loop sections of the S-springs 40.

The straps 250 serve the same purpose and function as the straps 50 of the first embodiment, as is described in greater detail below.

Function of the Seat Assembly

Figure 9:
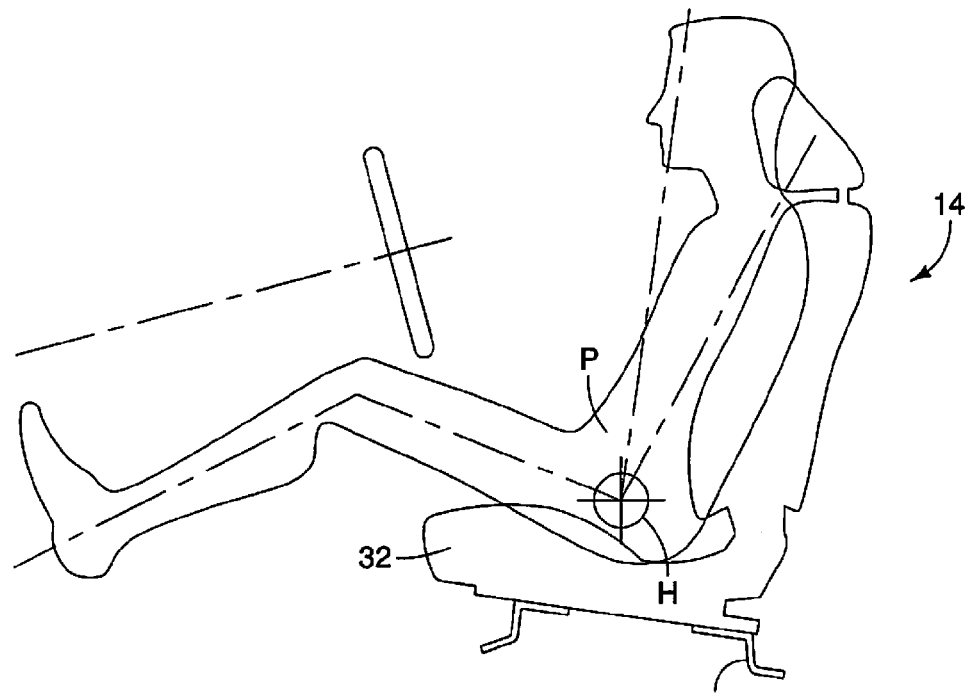
FIG. 9 is a side schematic view of the seat assembly with a passenger seated therein, showing a H-point (a point that corresponds to an approximate location for the passenger's hip) relative to the seat assembly, with the passenger and the seat in an at rest orientation with no changes in momentum and with the strap assembly in a slack, non-tensioned condition in accordance with the first, second and third embodiments.

FIG. 9 is a side schematic view representing any of the seat assemblies 14, 114 or 214 with a passenger P seated therein. FIG. 9 shows a circle superimposed onto the passenger P that represents an H-point H of the passenger P. The H-point H is a theoretical area that corresponds to an approximate location for the passenger's hips relative to the seat assembly. Specifically, as is well known in vehicle design, automotive design and vehicle regulation, the H-point H (or hip-point) is the theoretical, relative location of an occupant's hip. The H-point is the pivot point between the torso and upper leg portions of the passenger's body. The H-point can be measured relative to other features, such as the vehicle floor 20 or other reference point within a vehicle. Well known automotive design aspects that reference or consider the H-point include roof height, aerodynamics, visibility (both within the vehicle and from the vehicle into traffic), seating comfort, driver fatigue, ease of entry and exit, interior packaging, restraint and airbag design and impact event performance. Since the H-point and design theory associated therewith is well known in the art, further description is omitted for the sake of brevity.

Figure 10:
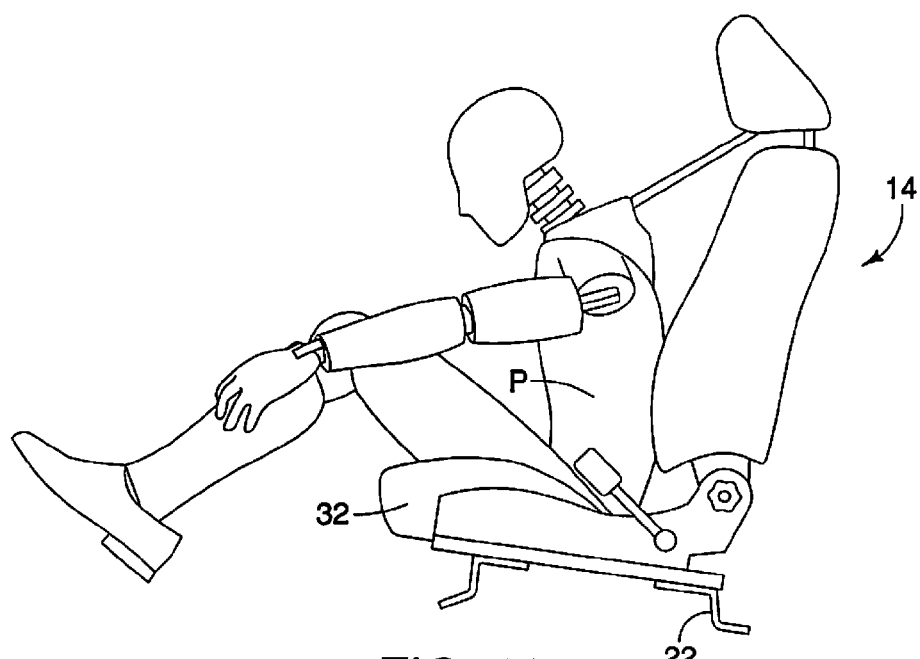
FIG. 10 is another side schematic view of the seat assembly with an anthropomorphic test device (ATD) seated therein, showing the H-point moved downward in response to the ATD undergoing downward movement in response to a rapid change in a restricted orientation with the strap assembly bearing at least a portion of the ATD's mass in a tensioned condition in accordance with the first, second and third embodiments.

During an impact event where the vehicle 10 and the passenger P can experience rapid changes in momentum, the passenger P can move relative to the seat assembly 14. Modern vehicles include restraining devices such as seat belts and airbags that limit forward and upward movement of the passenger P in response to rapid changes in momentum during an impact event. However, when the passenger P undergoes rapid downward movement in response to rapid changes in momentum during an impact event, the structure of the seat assembly 14 limits downward movement of the passenger P, as shown in FIG. 10.

The strap structures 30, 130 and 230 described above are each designed to restrict downward movement of the passenger P in response to rapid changes in momentum during an impact event where the passenger P is likely to move downward against the structure of the seat assemblies 14, 114 and 214.

The downward movement of the passenger P in response to rapid changes in momentum during an impact event cause each of the seat assemblies 14, 114 and 214 to respond in a generally identical manner, as is described below with respect to FIGS. 11, 12 and 13. In other words, regardless of the configuration of the strap structures 30, 130 and 230, each of the strap structures 30, 130 and 230 provides the same movement restricting feature described in greater detail below. Therefore, description of any one of the strap features 30, 130 and 230 applies equally to the others.

FIG. 11 is a side schematic view of the seat assembly 14 showing the seat assembly 14 in an unoccupied or at rest orientation in the absence of the passenger P. In the at rest orientation the hip receiving surface 32a of the cushion material 32 is located at a corresponding at rest position. A reference point $H_C$ is defined directly below the theoretical H-point H of the passenger P. The reference point $H_C$ is hereinafter used to indicate the relative movement of the hip receiving surface 32a of the cushion material 32 after the passenger P is seated on the cushion material 32. A line $L_2$ is defined at a level relative to the vehicle floor 20 of the vehicle 10 corresponding the location of the reference point $H_C$. The line $L_2$ is defined as a reference point level with the reference point $H_C$ for the purpose of demonstrating the movement of the reference point $H_C$ and the hip receiving surface 32a of the cushion material 32 with the passenger P seated thereon.

As shown in FIG. 12, with the passenger P seated in the seat assembly 14 in an occupied orientation, the H-point H moves downward to the position $H_1$. Similarly, the hip receiving surface 32a and the reference point $H_C$ of the cushion material 32 are moved downward. Specifically, in the occupied orientation, the cushion material 32 is partially compressed and the seat suspension structure 28 elastically deforms (elongates) in response to the mass of the passenger P acting on the seat assembly 14. Further, the reference point $H_C$ moves downward as indicated by a line $L_3$. As shown in FIG. 12, the line $L_3$ is below the line $L_2$ by a distance $D_1$ when the seat assembly 14 is in the occupied orientation with no changes in momentum occurring.

As is further shown in FIG. 12, although the S-springs 40 of the seat suspension structure 28 are under tension and have undergone some level of elastic elongation, the flexible straps 50 of the strap structure 30 remain slack and carry none of the mass of the passenger P. It should be understood from the drawings and the description herein that the distance $D_1$ can vary from passenger to passenger depending upon the size and mass of the passenger P and the design of the seat assembly 14. However, unless the passenger P is an extremely heavy individual, the flexible straps 50 will be slack with the seat assembly 14 and the passenger P at rest and in the occupied orientation.

FIG. 13 shows the seat assembly 14 with the passenger P seated thereon, but with the seat assembly 14 carrying an increased load in response to an impact event where the passenger P experiences a rapid change in momentum causing the passenger P to undergo downward momentary movement into the seat assembly 14. At the instant of peak downward movement, the H-point H moves downward to the position $H_2$. As well, the hip receiving surface 32$a$ and the reference point $H_C$ of the cushion material 32 are moved downward such that the reference point $H_C$ is at a level corresponding to a line $L_4$ in FIG. 13. The line $L_4$ is located below both the line $L_2$ and the line $L_3$. In the increased load condition shown in FIG. 13, the straps 50 of the strap structure 30 contacted by the cushion material 32 and the seat suspension structure 28 are further in tension, receiving at least a portion of the mass of the passenger P during the impact event. The depiction of the straps 50 of the strap structure 30 in tension and contacted by the cushion material 32 and the seat suspension structure 28 demonstrates that the straps 50 restrict downward movement of the passenger P, thereby preventing any further downward movement of the passenger P.

The distance $D_1$ shown in FIG. 12 represents a first movement range wherein in response to the passenger P sitting on the hip receiving surface 32$a$ of the seat assembly 14, the hip receiving surface 32$a$ moves into the seat cushion receiving area 24$d$ of the seat bottom frame 24 and also causes the seat suspension structure 28 to undergo elastic downward movement within a first movement range (the distance $D_1$ or less) providing comfort to the passenger P. In this state, the straps 50 of the strap structure 30 are dimensioned to remain slack during movement within the first movement range.

However, as shown in FIG. 13, further downward movement of the hip receiving surface 32$a$ into the seat cushion receiving area 24$d$ causes the seat suspension structure 28 to undergo further elastic downward movement within a second movement range (between the distance $D_1$ and the distance $D_2$) causing the strap structure 30 to become taught thereby restricting downward movement of the seat suspension structure 30 at a maximum of the second movement range (the distance $D_2$).

As is clear in the above description, the straps 50 of the strap structure 30 are installed to respective ones of the seat assemblies 14, 114 and 214 with a predetermined amount of slack that enables the above described restriction of movement of the H-point H relative to the seat assembly structure. It should be understood from the drawings and the description herein that the predetermined amount of slack provided to each of the straps 50 varies from seat assembly design to seat assembly design. The predetermined amount of slack provided to the straps 50 can be calculated, but is preferably determined based upon the anticipated movement of the H-point H in response to normal use of the corresponding seat assembly and an anticipated amount of mass of a passenger, as well as experimentation with an anthropomorphic test device (ATD) that simulates the presence of a passenger. Experimental data assists in determining the necessary amount of slack necessary for the straps 50. Since anthropomorphic test devices (ATD) are conventional tools in automobile testing, further description is omitted for the sake of brevity.

The various features of the vehicle 10 other than the seat assembly 14 are conventional components that are well known in the art. Since such vehicle related features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seat assembly comprising:
a seat bottom frame including a front frame portion and a rear frame portion defining a seat cushion receiving area therebetween;
a seat suspension structure having a front end attached to the front frame portion and a rear end attached to the rear frame portion such that the seat suspension structure extends through the seat cushion receiving area;
a strap structure having a front portion attached to one of the front frame portion and the front end of the seat suspension structure, and a rear portion attached to one of the rear frame portion and the rear end of the seat suspension structure, the strap structure extending through the seat cushion receiving area; and
a cushion material attached to the seat bottom frame and extending over the seat bottom frame, the seat suspension structure, the strap structure and the seat cushion receiving area, the cushion material defining a hip receiving surface, wherein
the seat suspension structure being configured such that in response to a vehicle passenger seated on the hip receiving surface of the cushion material causing downward movement of the hip receiving surface into the seat cushion receiving area also causes the seat suspension structure to undergo elastic downward movement within a first movement range providing comfort to the vehicle passenger, with the strap structure being dimensioned to remain slack during movement within the first movement range, and
further downward movement of the hip receiving surface into the seat cushion receiving area causes the seat suspension structure to undergo further elastic downward movement within a second movement range causing the strap structure to become taught thereby restricting downward movement of the seat suspension structure within the second movement range.

2. The vehicle seat assembly according to claim 1, wherein
the seat suspension structure includes a plurality of S-springs having an overall serpentine shape, portions of each of the plurality of S-springs extending in directions parallel to one another.

3. The vehicle seat assembly according to claim 2, wherein
the strap structure comprises a plurality of flexible straps having a fixed non-extendable length.

4. The vehicle seat assembly according to claim 3, wherein
each of the plurality of flexible straps is made of a high strength woven webbing.

5. The vehicle seat assembly according to claim 3, wherein
each of the plurality of flexible straps is made of a high strength metallic material.

6. The vehicle seat assembly according to claim 3, wherein
each of the plurality of flexible straps extends under a corresponding one of the plurality of S-springs.

7. The vehicle seat assembly according to claim 3, wherein
the plurality of flexible straps extend under the plurality of S-springs.

8. The vehicle seat assembly according to claim 3, wherein
each of the plurality of S-springs defines a series of loops, with each one of the plurality of flexible straps being installed along a corresponding one of the plurality of S-springs such that the one of the plurality of flexible straps extends over every other one of the loops under others of the loops.

9. The vehicle seat assembly according to claim 3, wherein
the plurality of S-springs comprise a fixed number of S-springs and the plurality of flexible straps comprise a fixed number of flexible straps that is equal to the fixed number of S-springs.

10. The vehicle seat assembly according to claim 3, wherein
the plurality of S-springs comprise a fixed number of S-springs and the plurality of flexible straps comprise a fixed number of flexible straps that is not equal to the fixed number of S-springs.

11. The vehicle seat assembly according to claim 2, wherein
a front end of each of the plurality of S-springs is fixedly attached to the front frame portion and a rear end of each of the plurality of S-springs is fixedly attached to the rear frame portion.

12. The vehicle seat assembly according to claim 1, wherein
the strap structure comprises a plurality of flexible straps having a fixed non-extendable length.

13. The vehicle seat assembly according to claim 12, wherein
the front portion of each of the plurality of flexible straps is fixed to the front end of the seat suspension structure at a location spaced apart from the front frame portion.

14. The vehicle seat assembly according to claim 12, wherein
the front portion of each of the plurality of flexible straps is fixed to the front frame portion.

15. The vehicle seat assembly according to claim 12, wherein
the rear portion of each of the plurality of flexible straps is fixed to the rear end of the seat suspension structure at a location spaced apart from the rear frame portion.

16. The vehicle seat assembly according to claim 12, wherein
the rear portion of each of the plurality of flexible straps is fixed to the rear frame portion.

17. The vehicle seat assembly according to claim 1, wherein
the first movement range of the seat suspension structure extends from a first distance below a top surface of the seat bottom frame to a second distance below the top surface of the seat bottom frame, the second distance being greater than the first distance.

18. The vehicle seat assembly according to claim 17, wherein
the second movement range of the seat suspension structure extends from the second distance below a top surface of the seat bottom frame to a third distance below the top surface of the seat bottom frame, the third distance being greater than the second distance.

19. A vehicle seat assembly comprising:

a seat bottom frame including a front frame portion and a rear frame portion defining a seat cushion receiving area therebetween;

a seat suspension structure having a front end attached to the front frame portion and a rear end attached to the rear frame portion such that the seat suspension structure extends through the seat cushion receiving area;

a strap structure having a front portion attached to the front frame portion, and a rear portion attached to the rear frame portion, the strap structure extending through the seat cushion receiving area; and a cushion material attached to the seat bottom frame and extending over the seat bottom frame, the seat suspension structure, the strap structure and the seat cushion receiving area, the cushion material defining a hip receiving surface, such that with the hip receiving surface in an unoccupied state the strap structure is slack and without tension.

\* \* \* \* \*